May 27, 1930.  E. J. HALL  1,760,492
COUPLING
Filed Oct. 26, 1927   2 Sheets-Sheet 1

INVENTOR
Elbert J. Hall
BY F. H. Gibbs
ATTORNEY

May 27, 1930.  E. J. HALL  1,760,492
COUPLING
Filed Oct. 26, 1927  2 Sheets-Sheet 2

INVENTOR
Elbert J. Hall
BY
ATTORNEY

Patented May 27, 1930

1,760,492

UNITED STATES PATENT OFFICE

ELBERT J. HALL, OF DETROIT, MICHIGAN, ASSIGNOR TO AMERICAN CAR AND FOUNDRY MOTORS COMPANY, OF NEW YORK, N. Y., A CORPORATION OF DELAWARE

COUPLING

Application filed October 26, 1927. Serial No. 228,818.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

Figure 1:
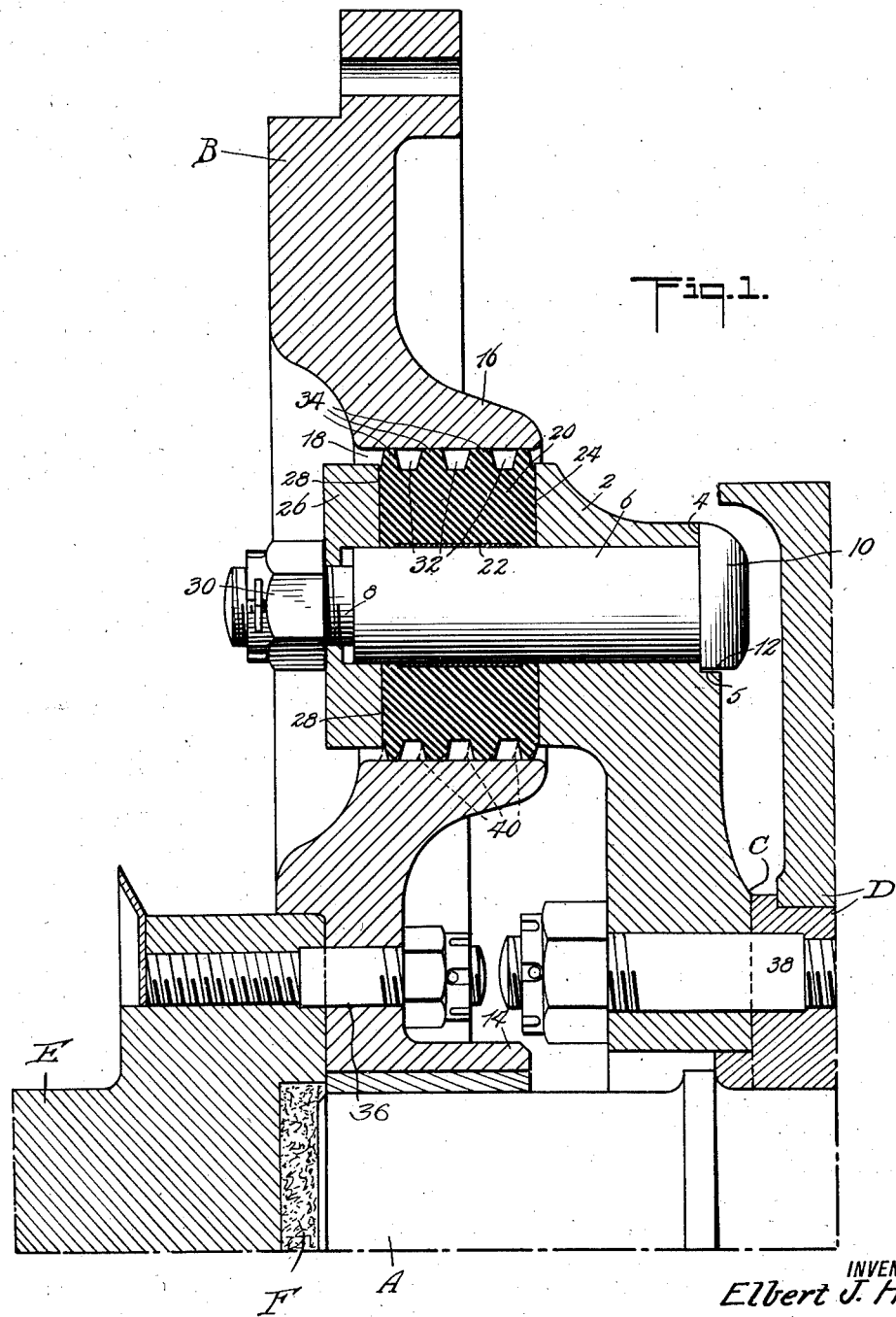
Figure 2:
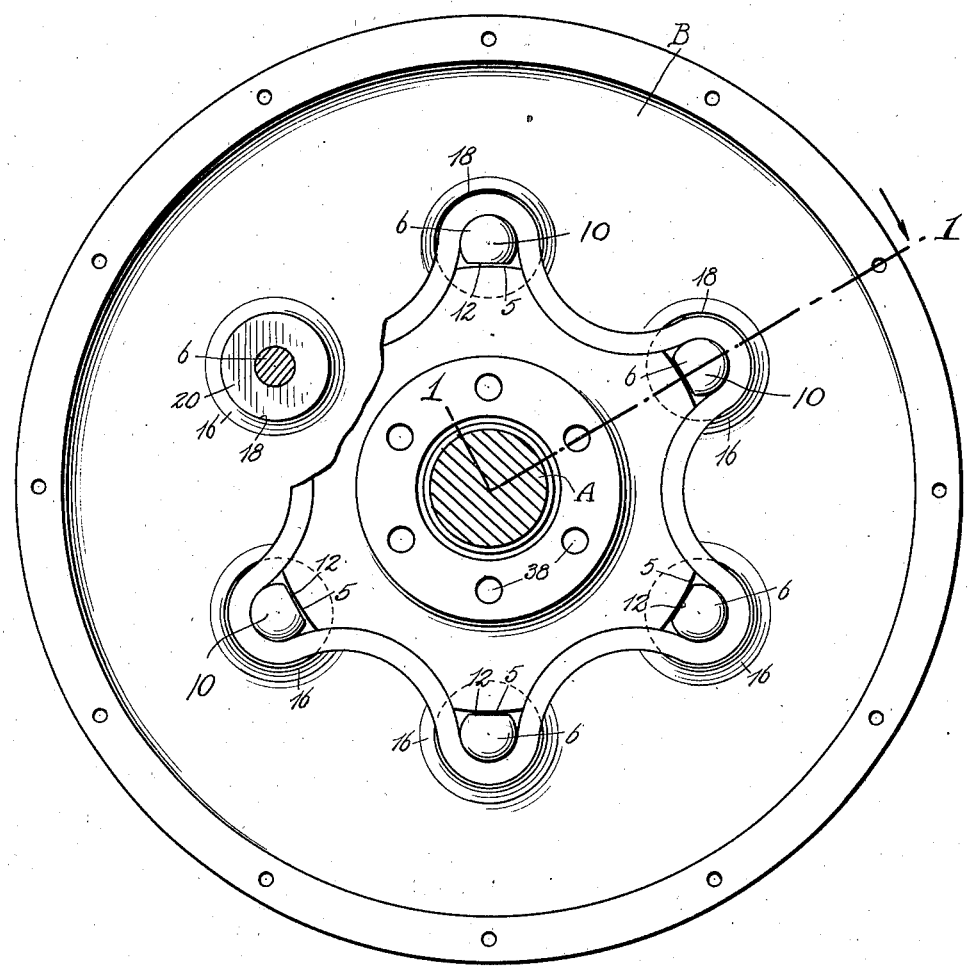

In said drawings:

Figure 1 is a sectional view of the device of the present invention, taken on the line 1—1 of Fig. 2; and Fig. 2 is a front elevation of the device, certain parts being shown as broken away.

This invention relates generally to couplings, and refers more particularly to a flexible coupling for connecting a generator to a fly-wheel or the like.

One of the main objects of this invention is the provision of a simple, easily applied and durable connection between the armature of a generator or the like and a fly-wheel which shall provide a resilient connection to the armature and shall also afford a yielding or yieldable connection for transmitting the motor torque to the armature.

Another object of the invention is the provision of a connection between a generator and a fly-wheel which may be adjusted axially to compensate for wear.

A further object of the invention is the provision of a spider or the like secured to an armature shaft and connected to a fly-wheel in such a manner as to permit a certain amount of axial movement of the flywheel with respect to the armature shaft such as may be occasioned by a difference in expansion between associated elements or because of minor variations in manufacture of the parts or because of non-alinement between the engine and the generator of a vehicle.

Other objects and advantages of this invention will be apparent from the following description taken with the accompanying drawings in which A indicates an armature shaft of any desired construction having the armature D mounted thereon and B indicates a fly-wheel attached to the motor shaft E. Attached to the armature D is a spider C having a plurality of lobes 2, each provided with a seat 4 defined by a shoulder 5. Each lobe is provided with an opening through which extends a pin 6 having one end reduced and threaded as at 8, and the other end provided with a head 10 having a flattened surface 12 which is arranged adjacent the shoulder 5; the pin 6 being restrained against rotation by engagement of the surface 12 of the pin with the shoulder 5, as will be apparent.

The fly-wheel B is provided with a hub 14, and arranged circumferentially around the hub are a plurality of portions 16 in the shape of bosses offset with respect to the web of the flywheel and provided with apertures 18 which provide seats for the reception of resilient inserts 20 which are, in effect, driving elements. As shown clearly in Fig. 1, the pins 6 extend centrally through the apertures 18, and the driving elements 20 are mounted thereon, each of said driving elements being provided with an internal sleeve 22 of brass or the like for an obvious purpose. The drive elements 20 abut the outer faces 24 of the lobes 2 and are retained on the pins 6 by washers or compression elements 26 which fit over the pins 6 and also engage the reduced ends thereof as shown clearly in Fig. 1. The washers 26 are of substantial diameter; in fact, large enough to engage almost the complete outer faces 28 of the drive elements 20, and they are retained in engagement with said faces by nuts 30 secured to the threaded ends 8 of the pins 6.

As clearly shown in Fig. 1, the drive elements are provided with a plurality of spaced annular recesses 32 on their periphery which define annular ribs 34 extending circumferentially around these inserts or driving elements.

The fly-wheel and spider are preferably connected to the motor and armature, respectively, by suitable securing means, as bolts, extending through the openings 36 and 38 in the fly wheel and spider respectively.

In assembling the device, the spider C is connected to the armature D as shown after the pins 6 have been mounted in lobes 2 of the spider. The pins 6 are then inserted in the openings 18 in the flywheel B by bringing the flywheel and armature together with the armature shaft A engaging in the opening in the hub 14 of the flywheel and abutting a yielding packing F. The resilient inserts 20 are then applied to the pins 6 and the compression members 26 placed upon the ends of the pins 6. Each compression member is then adjusted by means of a nut 30 whereby to compress the inserts 20 and thus expand the same peripherally until the ribs 34 are in close driving engagement with the walls of the openings 18 in the bosses 16. The walls of the openings 18 formed in the flywheel B define seats for the driving elements 20, and attention is called to the fact that the brass sleeve 22 is of less length than the distance between the front and rear faces of the elements 20 whereby compression of the elements 20 may be effected.

The annular recesses 32 in addition to permitting the engagement of the ribs with their seats, also permit in a degree the axial movement of the fly wheel with respect to the armature shaft A which may be occasioned by minor defects in manufacture such as sometimes occur which may result, for example, in inaccuracy of alinement between an en gine and generator, and during such movement, the ribs will bend as shown in dotted lines at 40.

What is claimed is:

1. In combination with a fly wheel having a series of openings formed therein, a rotatable shaft, a spider secured to the shaft and provided with a plurality of lobes extending adjacent the fly-wheel openings, resilient driving elements secured to the lobes and positioned within the openings, said elements have annular recesses defining spaced ribs adapted to engage the walls of said openings, and a compression member engaging the driving elements for expanding the latter against the walls of said openings.

2. In combination with a fly-wheel having a series of openings, a rotary shaft and means connecting said shaft and fly-wheel comprising a spider secured to the shaft and extending adjacent the openings, pins extending through the spider and restrained against rotation therein, resilient driving elements mounted on the pins, said driving elements each having spaced ribs on the periphery thereof, and means substantially covering the outer faces of the driving elements and adjustable to expand the latter into close engagement with the walls of the openings.

3. In combination with a fly-wheel having a series of openings formed thereon, a rotary shaft, a spider secured to the shaft and extending adjacent the openings, pins extending through the spider and restrained against rotation therein, resilient driving elements mounted on the pins and abutting the spider, said driving elements each having spaced ribs on the periphery thereof, and means substantially covering the outer faces of the driving elements and adjustable on said pins to expand the driving elements into close engagement with the walls of the openings.

4. In a device of the kind described, a flywheel having a plurality of inwardly extending circular seats, a rotatable shaft and means connecting said shaft and fly-wheel including resilient inserts connected to said shaft and mounted in said seat and provided with a plurality of spaced ribs at the periphery thereof, and means for compressing said inserts whereby to effect a peripheral expansion thereof.

5. In a device of the kind described, a flywheel having a plurality of inwardly extending bosses arranged to one side of the central plane through the vertical axis of the wheel, a rotatable shaft, a spider secured to the shaft and extending adjacent the bosses, pins extending through the spider and into the bosses, a resilient insert mounted on each pin and abutting the spider, a compression member mounted on each pin adjacent the inserts, and means for adjusting the compression members to expand the inserts to force the latter into close driving connection with the bosses, each of said inserts having annular ribs at the periphery thereof.

In witness whereof I have hereunto set my hand.

ELBERT J. HALL.